United States Patent
Ono

(10) Patent No.: US 9,764,643 B2
(45) Date of Patent: Sep. 19, 2017

(54) VEHICLE

(71) Applicant: Toru Ono, Nagoya (JP)

(72) Inventor: Toru Ono, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 14/647,712

(22) PCT Filed: Mar. 21, 2013

(86) PCT No.: PCT/JP2013/058007
§ 371 (c)(1),
(2) Date: May 27, 2015

(87) PCT Pub. No.: WO2014/147781
PCT Pub. Date: Sep. 25, 2014

(65) Prior Publication Data
US 2015/0375621 A1    Dec. 31, 2015

(51) Int. Cl.
*B60L 1/00* (2006.01)
*B60L 3/00* (2006.01)
(Continued)

(52) U.S. Cl.
CPC ............ *B60L 1/006* (2013.01); *B60L 1/003* (2013.01); *B60L 3/0023* (2013.01);
(Continued)

(58) Field of Classification Search
CPC ...... B60L 1/003; B60L 3/0069; B60L 11/005; B60L 15/2009; B60L 2210/10;
(Continued)

(56) References Cited

U.S. PATENT DOCUMENTS

2011/0055037 A1\* 3/2011 Hayashigawa ....... B60L 3/0069
705/26.1
2011/0309674 A1\* 12/2011 Kamachi ................ B60L 1/006
307/10.1
(Continued)

FOREIGN PATENT DOCUMENTS

CN    101218119 A    7/2008
CN    102452325 A    5/2012
(Continued)

*Primary Examiner* — Jared Fureman
*Assistant Examiner* — Duc M Pham
(74) *Attorney, Agent, or Firm* — Oliff PLC

(57) ABSTRACT

A vehicle is provided with an electrical storage device, a first connector capable of charging and discharging the power of the electrical storage device, a second connector capable of charging and discharging the power of the electrical storage device, and an ECU for controlling charging and discharging performed via the first connector and the charging and discharging performed via the second connector. The ECU selects and implements any one of the following according to the operation of an operation unit provided to a first plug connected to the first connector: discharging from the electrical storage device via the first connector, charging to the electrical storage device via the first connector, discharging from the electrical storage device via the second connector, and charging to the electrical storage device via the second connector.

7 Claims, 8 Drawing Sheets

(51) Int. Cl.

| | | |
|---|---|---|
| *B60L 3/04* | (2006.01) | |
| *B60L 11/00* | (2006.01) | |
| *B60L 11/12* | (2006.01) | |
| *B60L 11/14* | (2006.01) | |
| *B60L 11/18* | (2006.01) | |
| *B60L 15/20* | (2006.01) | |
| *H02J 3/32* | (2006.01) | |
| *H02J 7/02* | (2016.01) | |
| *H02J 7/34* | (2006.01) | |
| *H02J 7/00* | (2006.01) | |

(52) U.S. Cl.
CPC ............ *B60L 3/0069* (2013.01); *B60L 3/04* (2013.01); *B60L 11/005* (2013.01); *B60L 11/123* (2013.01); *B60L 11/14* (2013.01); *B60L 11/184* (2013.01); *B60L 11/1811* (2013.01); *B60L 11/1818* (2013.01); *B60L 11/1824* (2013.01); *B60L 11/1842* (2013.01); *B60L 11/1844* (2013.01); *B60L 11/1846* (2013.01); *B60L 11/1848* (2013.01); *B60L 11/1861* (2013.01); *B60L 11/1887* (2013.01); *B60L 15/2009* (2013.01); *H02J 3/32* (2013.01); *H02J 7/02* (2013.01); *H02J 7/34* (2013.01); *B60L 2210/10* (2013.01); *B60L 2210/30* (2013.01); *B60L 2210/40* (2013.01); *B60L 2220/14* (2013.01); *B60L 2230/12* (2013.01); *B60L 2240/545* (2013.01); *B60L 2240/547* (2013.01); *B60L 2240/549* (2013.01); *H02J 2007/0067* (2013.01); *Y02E 60/721* (2013.01); *Y02T 10/6217* (2013.01); *Y02T 10/645* (2013.01); *Y02T 10/705* (2013.01); *Y02T 10/7011* (2013.01); *Y02T 10/7016* (2013.01); *Y02T 10/7022* (2013.01); *Y02T 10/7044* (2013.01); *Y02T 10/7077* (2013.01); *Y02T 10/7088* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 10/126* (2013.01); *Y04S 30/14* (2013.01)

(58) Field of Classification Search
CPC ............ B60L 2220/14; B60L 2230/12; B60L 2240/545; H02J 2007/0067; H02J 3/32; H02J 7/02; Y02T 10/7022; Y02T 90/34; Y04S 10/126; Y04S 30/14; Y02E 60/721
USPC ........................................................ 307/10.1
See application file for complete search history.

(56) References Cited

U.S. PATENT DOCUMENTS

| | | | |
|---|---|---|---|
| 2012/0112693 A1 | 5/2012 | Kusch et al. | |
| 2012/0206104 A1* | 8/2012 | Tsuchiya | B60L 11/1842 320/134 |
| 2013/0020993 A1* | 1/2013 | Taddeo | H02J 7/0027 320/109 |
| 2013/0314034 A1* | 11/2013 | Ang | B60W 20/00 320/107 |
| 2014/0002011 A1* | 1/2014 | Ang | B60L 11/1838 320/107 |
| 2014/0002024 A1* | 1/2014 | Ang | H02J 7/0036 320/109 |
| 2014/0217813 A1* | 8/2014 | Kinomura | B60L 1/006 307/10.1 |

FOREIGN PATENT DOCUMENTS

| | | |
|---|---|---|
| JP | 2012-105527 A | 5/2012 |
| JP | 2012170259 A | 9/2012 |
| JP | 2012209995 A | 10/2012 |
| KR | 10-2008-0003905 A | 1/2008 |
| WO | 2006/121761 A2 | 11/2006 |

* cited by examiner

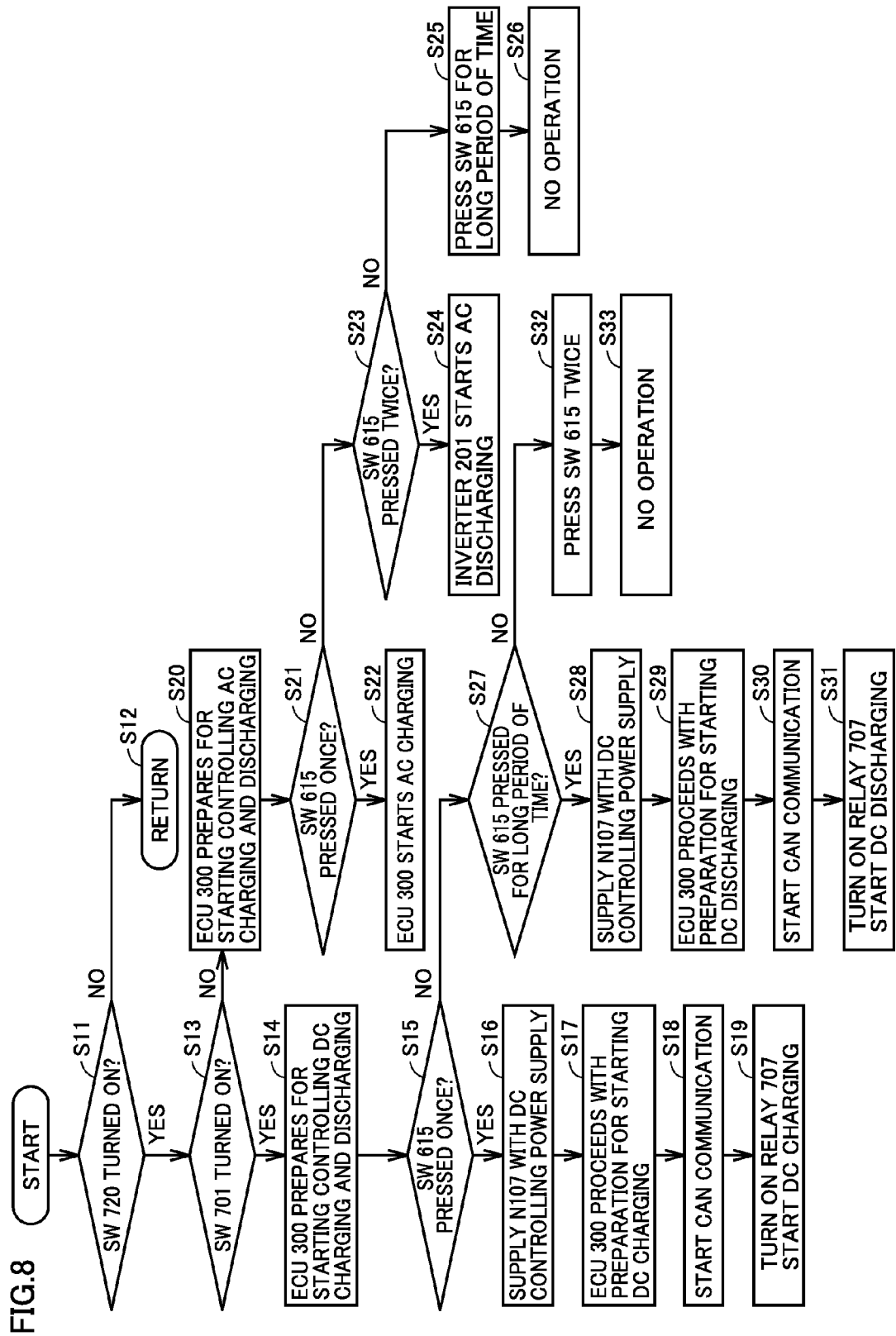

VEHICLE

TECHNICAL FIELD

The present invention relates to a vehicle and more specifically to a vehicle having a power storage device mounted therein and configured to be electrically chargeable from and dischargeable to outside the vehicle.

BACKGROUND ART

In recent years, a variety of electric power supplying systems have been proposed to supply household premises with electric power of a power storage device mounted in a vehicle and charge a vehicular mounted power storage device with electric power of household premises. One such electric power supplying system is disclosed in Japanese Patent Laying-Open No. 2012-170259 (PTD 1).

For example, an electric power supplying system supplies a vehicle that includes a DC connector, an AC connector and a power storage device to be capable of charging a vehicular mounted battery with electric power external to the vehicle. One such electric power supplying system is disclosed in Japanese Patent Laying-Open No. 2012-209995 (PTD 2).

In such an electric power supplying system, a vehicular control unit receives a variety of signals including a controlling power supply potential and a ground potential via a DC plug connected to a DC connector, and operates in response to the variety of signals to charge a battery mounted in a vehicle. The DC plug is connected to a charger external to the vehicle, and the charger is driven by external electric power.

CITATION LIST

Patent Documents

PTD 1: Japanese Patent Laying-Open No. 2012-170259
PTD 2: Japanese Patent Laying-Open No. 2012-209995

SUMMARY OF THE INVENTION

Technical Problem

Such a vehicle as described above is controlled on the premise that the charger external to the vehicle is supplied with electric power. As such, if the charger is not supplied with electric power, the vehicle is not supplied with the controlling power supply potential and the vehicle cannot provide communications or open/close a relay. As such, if in an emergency the charger has interruption of electric power, and there is a need for extracting electric power from the vehicular mounted battery to outside the vehicle, there is no way to apply control to output the electric power to the DC connector.

Furthermore, if solar light, wind power, and the like are exploited to privately generate electric power, the vehicular battery cannot be charged thereby once commercial power supply has failed.

The present invention contemplates a vehicle allowing charging and discharging while power transmitting and receiving devices external to the vehicle have interruption of electric power.

Solution to Problem

The present invention is summarized as follows: a vehicle capable of supplying electric power to outside the vehicle, comprising: a power storage device; a first connecter capable of charging and discharging electric power of the power storage device; a second connecter capable of charging and discharging electric power of the power storage device; and a control device that controls charging and discharging provided via the first connector, and charging and discharging provided via the second connector. The control device is operative in response to a control portion being operated to select and perform any one of discharging the power storage device via the first connector, charging the power storage device via the first connector, discharging the power storage device via the second connector, and charging the power storage device via the second connector, the control portion being provided at a first plug connected to the first connector.

Preferably, the control portion is configured to be capable of issuing a charge instruction or a discharge instruction and a perform instruction of charging or discharging. The control device is signaled of a state of the control portion via the first connector, and when the control device receives the discharge instruction and also receives the perform instruction, the control device performs discharging the power storage device to outside the vehicle, and when the control device receives the charge instruction and also receives the perform instruction, the control device allows electric power to be received from outside the vehicle to perform charging the power storage device.

More preferably, when the control device receives the perform instruction and the discharge instruction via the first connector, with a second plug unconnected to the second connector, the control device performs discharging the power storage device to outside the vehicle via the first connector. When the control device receives the perform instruction and the discharge instruction via the first connector, with the second plug connected to the second connector, the control device performs discharging the power storage device to outside the vehicle via the second connector.

Preferably, the second connector is configured to allow a second plug to be connected thereto, the second plug being provided at one end of a cable having the other end connected to a power conditioner station. The control portion is configured to be capable of issuing a first pattern signal and a signal of a pattern different from the first pattern signal. When the control device receives the first pattern signal via the first connector, with the second plug connected to the second connector, the control device allows electric power to be received from outside the vehicle via the first connector or the second connector to perform charging the power storage device, and when the control device receives the signal different from the first pattern signal via the first connector, with the second plug connected to the second connector, the control device performs discharging the power storage device to outside the vehicle via the first connector or the second connector.

Still preferably, the second connector includes an input node to receive from the power conditioner station a signal indicative of a command to start discharging from the power storage device to the power conditioner station. When the control device receives the second pattern signal and the discharge instruction via the first connector, with the first plug connected to the first connector, and the second plug connected to the second connector, instead of the power conditioner station, the control device outputs to the input node a signal indicative of the command to start discharging.

More preferably, the second connector is configured to allow a second plug to be connected thereto, the second plug being provided at one end of a cable having the other end connected to a power conditioner station, the vehicle further comprises a first CAN communication unit, the power conditioner station includes a second CAN communication unit, and when the control device receives an instruction from the control portion, with the second plug connected to the second connector, then the control device initiates the first CAN communication unit to perform communication.

Preferably, the first connector is a connector for alternating current power and the second connector is a connector for direct current power.

Advantageous Effects of Invention

The present invention thus allows charging and discharging between a vehicle and power transmitting and receiving devices external to the vehicle while the power transmitting and receiving devices have interruption of electric power.

BRIEF DESCRIPTION OF THE DRAWINGS

FIG. 8 is a flowchart of a second example for illustrating how the ECU applies control for DC charging and discharging in an emergency.

DESCRIPTION OF EMBODIMENTS

Hereinafter reference will be made to the drawings to more specifically describe the present invention in embodiments. In the figures, identical or corresponding components are identically denoted to avoid redundant description.

Vehicle and Alternating Current Charging Cable

Figure 1:
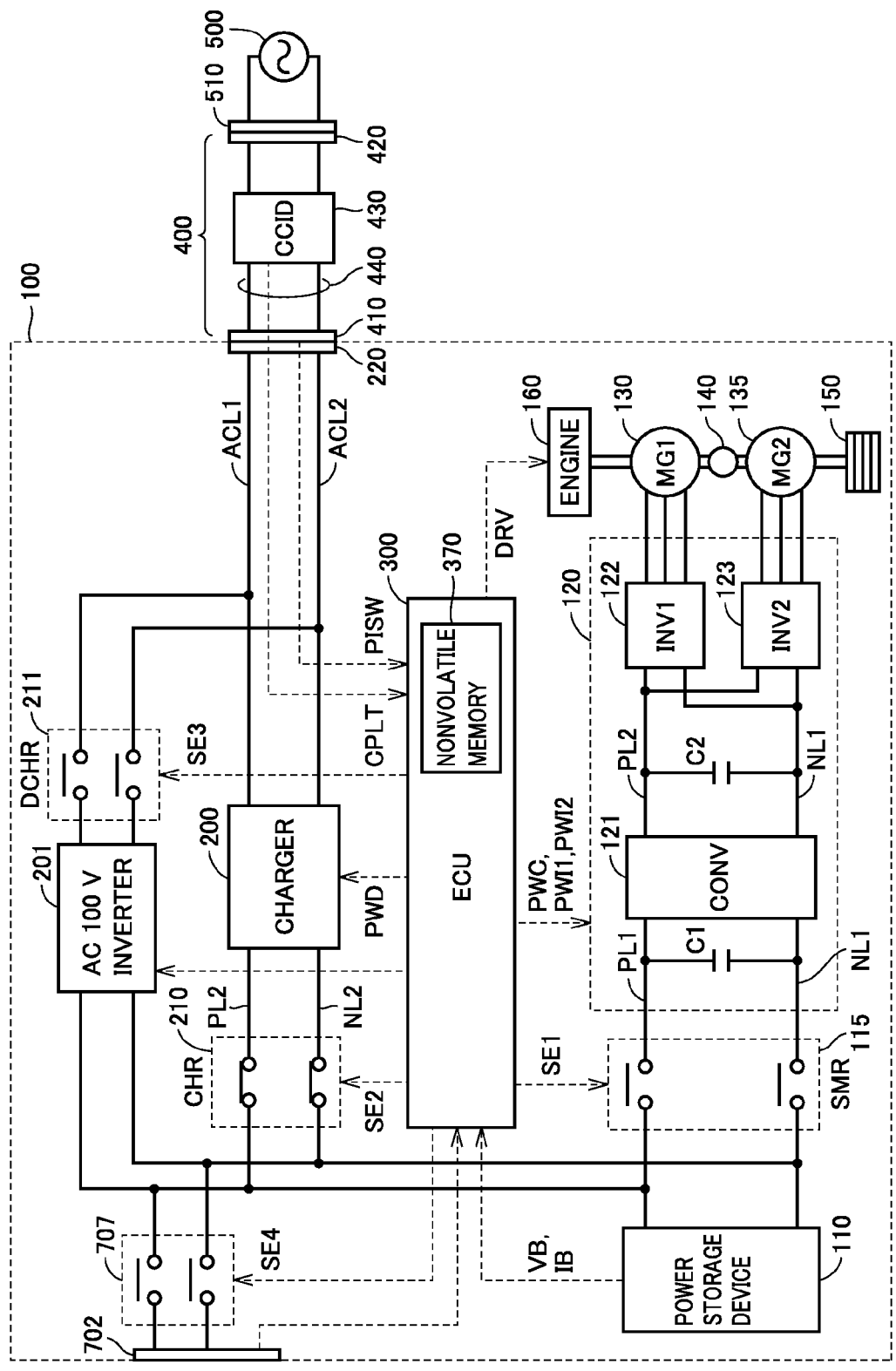
FIG. 1 is a general block diagram of a hybrid vehicle 100.

FIG. 1 is a general block diagram of a hybrid vehicle 100. With reference to FIG. 1, vehicle 100 includes a power storage device 110, a system main relay (SMR) 115, a power control unit (PCU) 120, an air conditioner 125, motor generators 130, 135, a driving force transmission gear 140, a driving wheel 150, an engine 160, and a control device or electronic control unit (ECU) 300. PCU 120 includes a converter 121, inverters 122, 123, and capacitors C1, C2.

Power storage device 110 is a chargeably and dischargeably configured electric power storage component. Power storage device 110 for example includes a rechargeable battery such as a lithium ion battery, a nickel metal hydride battery or a lead acid battery, or a power storage element such as an electric double layer capacitor.

Power storage device 110 is connected to PCU 120 via a positive power line PL1 and a negative power line NL1. Power storage device 110 supplies PCU 120 with electric power for generating force to drive vehicle 100. Furthermore, power storage device 110 stores therein electric power generated by motor generators 130, 135. Power storage device 110 outputs approximately 200 V for example.

Power storage device 110 includes a voltage sensor (not shown) and a current sensor (not shown) to sense power storage device 110's voltage VB and current IB, which are in turn output to ECU 300.

SMR 115 includes relays, one connected to a positive polarity end of power storage device 110 and positive power line PL1 connected to PCU 120, and the other connected to a negative polarity end of power storage device 110 and negative power line NL1. SMR 115 operates in response to a control signal SE1 received from ECU 300 to switch supplying electric power between power storage device 110 and PCU 120 to interrupting electric power therebetween and vice versa.

Converter 121 operates in response to a control signal PWC received from ECU 300 to perform voltage conversion between positive and negative power lines PL1 and NL1 and positive and negative power lines PL2 and NL1.

Inverters 122, 123 are connected to positive and negative power lines PL2 and NL1 in parallel. Inverters 122, 123 operate in response to control signals PWI1 and PWI2, respectively, received from ECU 300 to convert direct current (dc) power that is received from converter 121 into alternating current (ac) power to drive motor generators 130, 135, respectively.

Capacitor C1 is provided between positive and negative power lines PL1 and NL1, and decreases voltage variation caused between positive and negative power lines PL1 and NL1. Capacitor C2 is provided between positive and negative power lines PL2 and NL1, and decreases voltage variation caused between positive and negative power lines PL2 and NL1.

Motor generator 130, 135 is an ac rotating electric machine, and for example is a permanent-magnet type, synchronous electric motor including a rotor having a permanent magnet embedded therein.

Motor generators 130, 135 output torque, which is in turn transmitted to driving wheel 150 via driving force transmission gear 140 configured with a speed reducer, a driving force split device and the like included therein to thus causes vehicle 100 to travel. When vehicle 100 is braked regeneratively, motor generators 130, 135 can generate electric power via the torque of driving wheel 150. Then, the generated electric power is converted by PCU 120 into electric power used to charge power storage device 110.

Furthermore, motor generators 130, 135 are also coupled with engine 160 via driving force transmission gear 140. Then, motor generators 130, 135 and engine 160 are cooperatively operated by ECU 300 to generate force required to drive the vehicle. Furthermore, motor generators 130, 135 can generate electric power via the rotation of engine 160, and the generated electric power can be used to charge power storage device 100. Note that in the present embodiment, motor generator 135 is used exclusively as an electric motor for driving driving wheel 150 whereas motor generator 130 is used exclusively as a power generator driven by engine 160.

Note that while FIG. 1 illustrates a configuration provided with two motor generators, the number of motor generators is not limited thereto, and a single motor generator or three or more motor generators may be provided. Furthermore, vehicle 100 may be an electric vehicle which does not have an engine mounted therein, or may be a fuel-cell vehicle.

Vehicle 100 has a configuration for charging power storage device 110 by electric power received from an external alternating current (ac) power supply 500, and the configuration includes a charger 200, a charging relay CHR 210, an AC inlet 220 serving as an alternating current connection unit, a charging and discharging relay 707, and a DC inlet 702 serving as a direct current connection unit. To DC inlet 702 is connected a plug for charging and discharging a direct current, as will be described hereinafter with reference to FIG. 5 and FIG. 6.

To AC inlet 220 is connected a charging connector 410 of a charging cable 400. Then from external ac power supply 500 electric power is transmitted via charging cable 400 to vehicle 100.

Charging cable 400 includes, in addition to charging connector 410, a plug 420 for connecting to a receptacle 510 of external ac power supply 500, and a power line 440 connecting charging connector 410 and plug 420. Power line 440 has a charging circuit interrupt device (CCID) 430 inserted to switch supplying electric power from external AC power supply 500 to interrupting electric power supplied therefrom and vice versa.

Charger 200 is connected to AC inlet 220 via power lines ACL1 and ACL2. Furthermore, charger 200 is connected to power storage device 110 via CHR 210.

Charger 200 is controlled by a control signal PWD received from ECU 300, and receives ac power from AC inlet 220 and converts the received ac power to electronic power used to charge power storage device 110.

Vehicle 100 further has a configuration for externally supplying electric power, and the configuration includes an AC 100 V inverter 201 and a discharging relay DCHR 211. Note that AC inlet 220 is also used as a connection unit that outputs ac power. Connecting to an inlet in discharging ac power is done in a configuration, which will be described hereinafter with reference to FIG. 2 to FIG. 4.

AC 100 V inverter 201 can also receive dc power from power storage device 110 or electric power that is generated by motor generators 130, 135 and converted by PCU 120 into dc power, convert the received dc power into ac power, and feed the ac power to outside the vehicle. Note that AC 100 V inverter 201 may be replaced with another device outputting ac voltage or dc voltage. Furthermore, charger 200 and AC 100 V inverter 201 may be a single device capable of charging and feeding, or bidirectional, power conversion.

CHR 210 is controlled by a control signal SE2 received from ECU 300 to switch supplying electric power between charger 200 and power storage device 110 to interrupting electric power therebetween and vice versa. DCHR 210 is controlled by a control signal SE3 received from ECU 300 to switch connecting a power path between AC inlet 220 and AC 100 V inverter 201 to disconnecting the power path and vice versa. Note that in charging as shown in FIG. 1, CHR 210 is controlled to be connected and DCHR 211 is controlled to be disconnected.

ECU 300 includes a nonvolatile memory 370 for storing an initial setting of an air conditioner and the like therein. Although not shown in FIG. 1, ECU 300 further includes a central processing unit (CPU), a memory device, and an input/output buffer, and ECU 300 receives a signal from each sensor or the like, outputs a control signal to each device, and also controls power storage device 110 and each device of vehicle 100. Note that these may not only be controlled as processed via software, and may also be controlled as processed via dedicated hardware (or electronic circuitry).

ECU 300 receives values of voltage VB and current IB, as sensed, from power storage device 110, and therefrom calculates what state of charge (SOC) power storage device 110 has.

ECU 300 receives from charging connector 410 a proximity detection signal PISW (hereinafter referred to as detection signal PISW) indicative of whether charging cable 400 is connected or disconnected. Furthermore, ECU 300 receives a control pilot signal CPLT (hereinafter referred to as pilot signal CPLT) from CCID 430 of charging cable 400. ECU 300 operates in response to these signals to perform a charging operation.

Note that while FIG. 1 shows ECU 300 as a single control device, it may be provided as discrete control devices provided for functions or devices, respectively, to be controlled, such as PCU 120, power storage device 110, and the like.

Alternating Current Charging Mode

Pilot signal CPLT and detection signal PISW, how AC inlet 220 and charging connector 410 are configured in geometry and how their terminals are arranged, and the like, are standardized for example in the U.S. Society of Automotive Engineers (SAE), the International Electrotechnical Commission (IEC), and the like.

Although not shown in the figure, CCID 430 includes a CPU, a memory device and an input/output buffer, and it receives and outputs each sensor and the control pilot signal and also controls a charging operation of charging cable 400.

Note that pilot signal CPLT is controlled in potential by ECU 300. Furthermore, the signal has a duty cycle set based on a rated current that can be supplied from external ac power supply 500 through charging cable 400 to vehicle 100.

Pilot signal CPLT oscillates periodically, as defined, when pilot signal CPLT has a potential decreased from a defined potential. Note that pilot signal CPLT has a pulse width set based on the rated current that can be supplied from external ac power supply 500 through charging cable 400 to vehicle 100. In other words, a control pilot circuit in CCID 430 notifies the vehicle 100 ECU 300 of the rated current via pilot signal CPLT by a duty ratio indicated by a ratio of the pulse width to the oscillation period.

Note that the rated current is determined for each charging cable and varies with the type of charging cable 400. Accordingly, pilot signal CPLT will have different duty ratios for different charging cables 400.

From a duty ratio of pilot signal CPLT received, ECU 300 can detect a rated current that can be supplied through charging cable 400 to vehicle 100.

When a relay in CCID 430 has a contact closed, charger 200 is provided with ac power from external ac power supply 500 and a preparation is completed for charging power storage device 110 from external ac power supply 500. ECU 300 outputs control signal PWD to charger 200 to convert ac power that is received from external ac power supply 500 into dc power that can be used to charge power storage device 110. Then, ECU 300 outputs control signal SE2 to close a contact of CHR 210 to charge power storage device 110.

Figure 2:
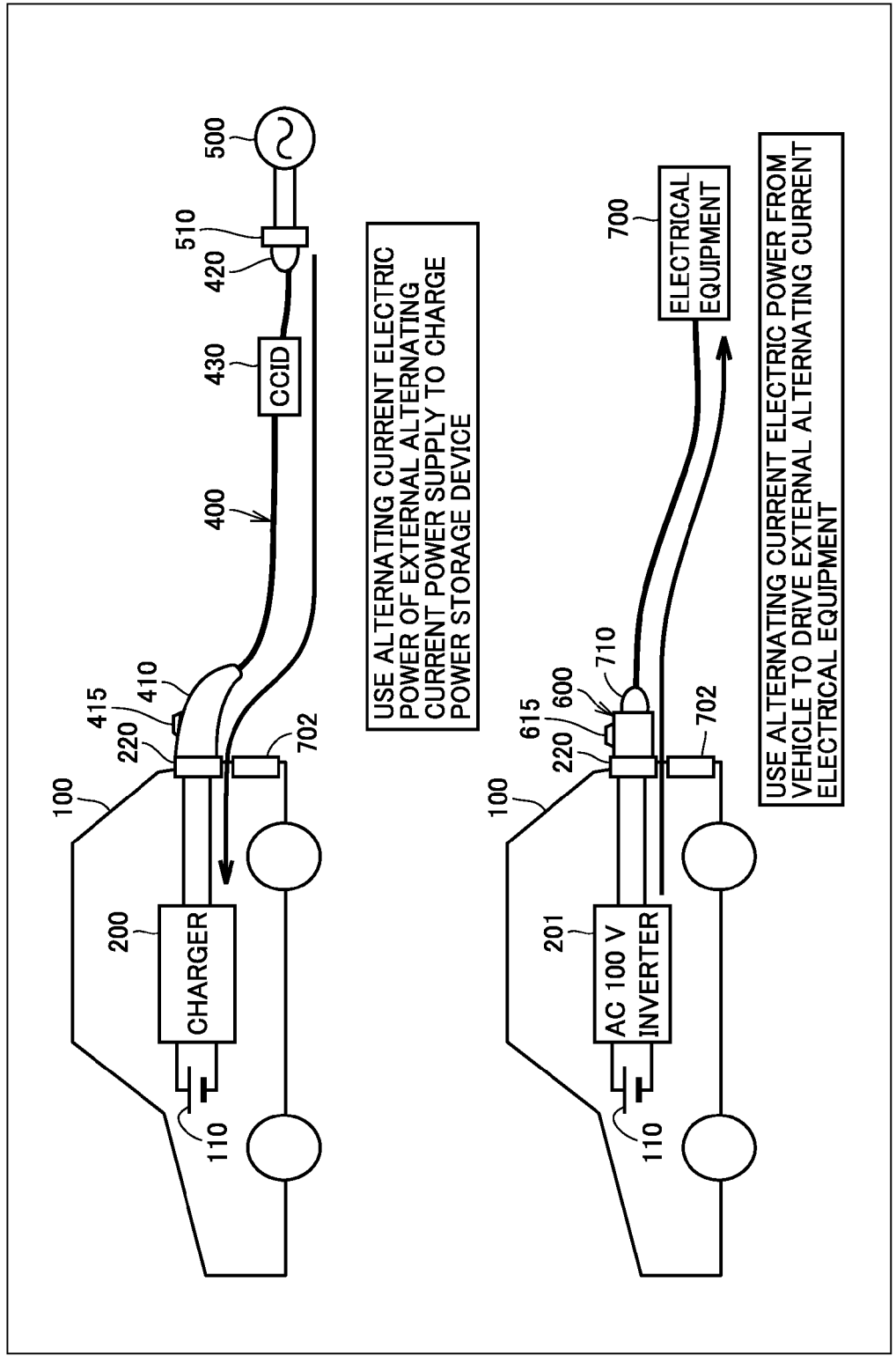
FIG. 2 illustrates charging/discharging alternating current (ac) power to/from a vehicle.

FIG. 2 illustrates charging/discharging ac power to/from a vehicle. As shown in FIG. 2 at an upper portion, externally chargeable vehicle 100 can store to power storage device 110 thereof electric power received from external ac power supply external 500 or a similar power supply external to the vehicle.

Alternating Current Discharge Mode

On the other hand, it has been discussed to consider a vehicle as a power supply source to supply electric power that is stored in the vehicle to electrical equipment external to the vehicle, such as seen in a so-called smart grid. Furthermore, the vehicle may be used as a power supply when electrical equipment is used in camping, outdoor and other activities.

In that case, as shown in FIG. 2, it would be suitable if AC inlet 220 allowing charging cable 400 to be connected thereto to perform external charging can be used to supply electric power from the vehicle, as doing so can eliminate the necessary of separately providing an outlet for connecting electrical equipment and thus eliminate or reduce the necessary of reconstructing the vehicle.

Accordingly, as shown in FIG. 2 at a lower portion, a converting power feed connector 600 that can be connected to AC inlet 220 that allows charging cable 400 to be connected thereto to perform external charging, is provided to allow electrical equipment 700 external to the vehicle to have a power supply plug 710 connected directly to vehicle 100, and to also allow vehicle 100 to feed electric power via AC inlet 220 to electrical equipment 700 external to the vehicle (hereinafter also referred to as "external power feeding").

Power feed connector 600 has a terminal portion having a shape similar to that of a terminal portion of charging connector 410 of charging cable 400 described with reference to FIG. 1, and can be connected in place of charging cable 400 to AC inlet 220 of vehicle 100.

By connecting power feed connector 600, dc power stored in power storage device 110 that serves as a power generation device is converted via AC 100 V inverter 201 of vehicle 100 into ac power that electrical equipment 700 can use, and thus supplied to electrical equipment 700, as will be described hereinafter.

Note that while vehicle 100 includes a power generation device that is power storage device 110, vehicle 100 in the form of a hybrid vehicle having engine 160 as shown in FIG. 1 further includes engine 160 and motor generator 130. In that case, engine 160 drives motor generator 130 to generate electric power (i.e., ac power), which is in turn converted via motor drive device 180 and AC 100 V inverter 201 into ac power that electrical equipment 700 can use, and thus supplied to electrical equipment 700. Furthermore, although not shown to FIG. 1, it is also possible to use electric power received from an auxiliary battery used for supplying power supply voltage to an auxiliary device included in vehicle 100. Alternatively, if vehicle 100 is a fuel-cell vehicle, it is also possible to supply electric power generated by a fuel cell.

In other words, the electric power of power storage device 110 can be supplied to AC inlet 220 via AC 100 V inverter 201. The electric power stored in power storage device 110 or the electric power generated as engine 160 is driven is supplied to electrical equipment 700 via power feed connector 600.

Note that while FIG. 1 shows a configuration with external charging performed exclusively by a discrete power conversion device and external power feeding performed exclusively by a discrete power conversion device, charger 200 may be provided as a single power conversion device capable of an external charging and external power feeding, or bidirectional, power conversion operation.

Figure 3:
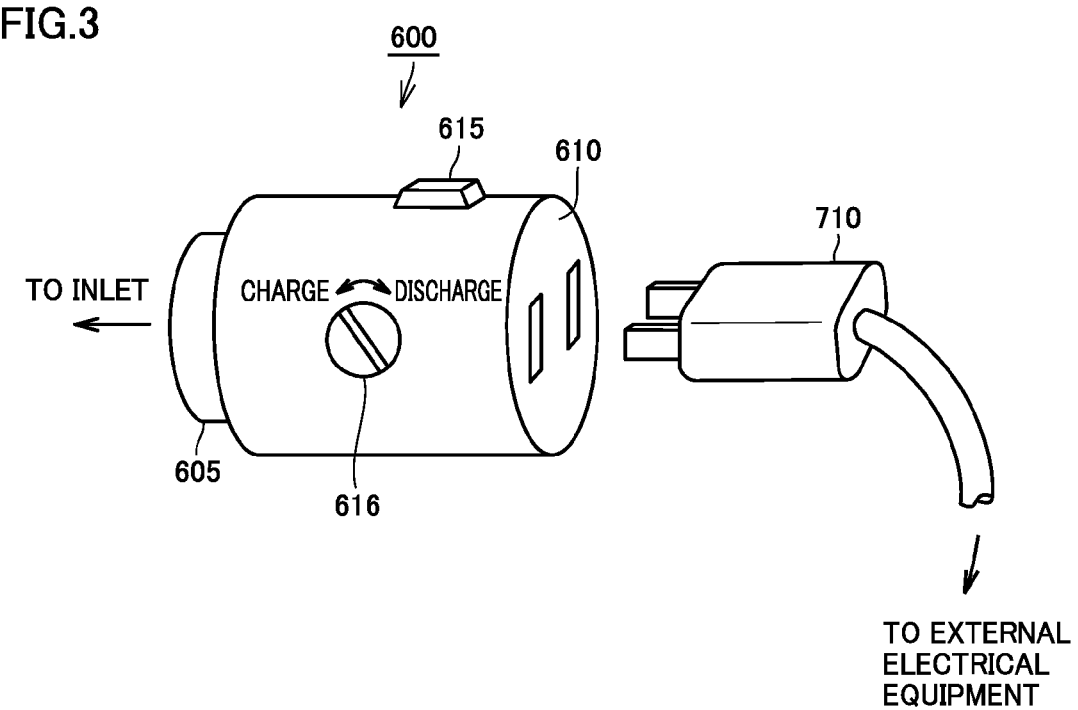
FIG. 3 schematically shows a power feed connector 600.

FIG. 3 schematically shows power feed connector 600. With reference to FIG. 3, power feed connector 600 is provided with a fitting portion 605 and control portions 615, 616. Fitting portion 605 has a shape corresponding to AC inlet 220 so that the former can be fitted to the latter. Control portion 615 is a switch for issuing an instruction to start feeding electric power, and control portion 616 is a switch for switching charging to discharging and vice versa.

Power feed connector 600 is provided with an output portion 610 allowing the external electrical equipment 700 power supply plug 710 to be connected thereto. Output portion 610 and power feed connector 600 may be configured discretely and connected by a cable.

When power feed connector 600 is connected to AC inlet 220, vehicle 100 performs a power feeding operation and supplies electric power therefrom via AC inlet 220 and power feed connector 600 to electrical equipment 700.

Figure 4:
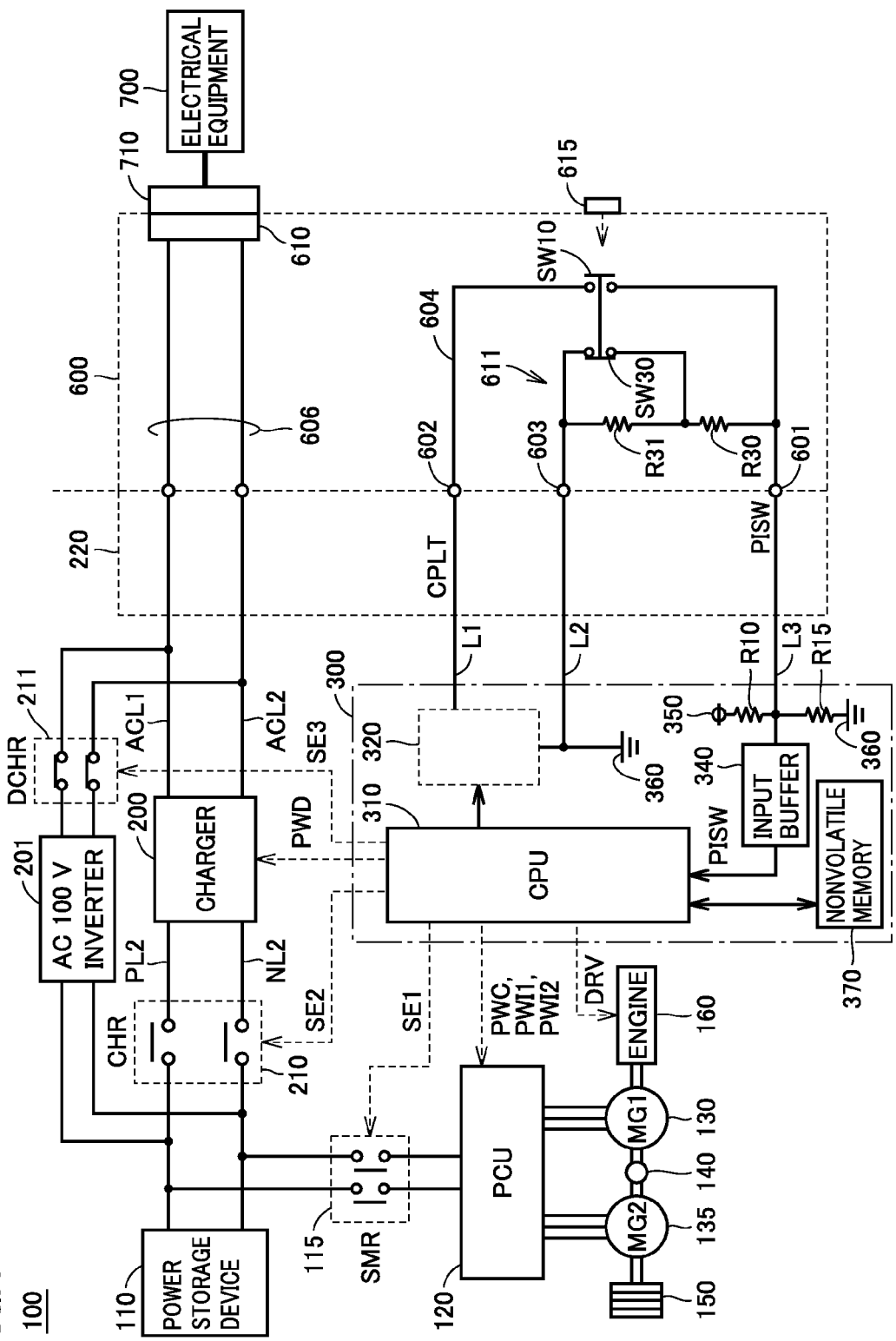
FIG. 4 is a block diagram for illustrating a power feeding operation performed when the FIG. 3 power feed connector is used.

FIG. 4 is a block diagram for illustrating a power feeding operation performed when the FIG. 3 power feed connector is used. It should be noted that those components shown in FIG. 4 which are denoted by reference characters identical to those indicated in FIG. 1 will not be described repeatedly.

With reference to FIG. 4, ECU 300 mounted in vehicle 100 includes a power supply node 350, a pull-up resistor R10 and a pull-down resistor R15, a CPU 310, a resistor circuit 320, and an input buffer 340.

Resistor circuit 320 is a circuit for controlling pilot signal CPLT in potential from vehicle 100.

Input buffer 340 receives detection signal PISW and outputs the received detection signal PISW to CPU 310. Note that a voltage is applied to a connection signal line L3 by ECU 300, and detection signal PISW varies in potential once charging connector 410 is connected to AC inlet 220. CPU 310 detects detection signal PISW in potential to detect whether charging connector 410 is connected or disconnected and fitted or not fitted.

CPU 310 receives detection signal PISW from input buffer 340. CPU 310 detects detection signal PISW in potential and detects whether power feed connector 600 is connected or disconnected and fitted or not fitted.

Once power feed connector 600 is connected to AC inlet 220, the vehicle 100 power lines ACL1, ACL2 and output portion 610 are electrically connected via a power transmission portion 606.

Power feed connector 600 includes a connection 601 connected to connection signal line L3, a connection 602 connected to connection 601 and a control pilot line L1, a connection 603 connected to a ground line L2, and a connection circuit 604.

Connection 601 is electrically connected to connection signal line L3 once power feed connector 600 has been attached to AC inlet 220. Connection 602 is electrically connected to control pilot line L1 once power feed connector 600 has been attached to AC inlet 220. Connection 603 is electrically connected to ground line L2 once power feed connector 600 has been attached to AC inlet 220.

Power feed connector 600 further includes resistors R30, R31, and a switch SW30. When power feed connector 600 is connected to AC inlet 220, resistors R30 and R31 are connected in series between connection signal line L3 and ground line L2.

Switch SW30 and resistor R31 are connected in parallel. Switch SW30 has a contact closed with power feed connector 600 fully fitted to AC inlet 220. In other words, switch SW30 is normally closed. When power feed connector 600 is disconnected from AC inlet 220 or it is uncertain whether power feed connector 600 is fully fitted to AC inlet 220, switch SW30 has the contact opened. Furthermore, switch SW30 also has the contact opened by control portion 615 being operated. Accordingly, switch SW30 has a state varying when power feed connector 600 is attached to vehicle 100 and when power feed connector 600 is removed from vehicle 100.

When power feed connector 600 is connected to AC inlet 220, CPU 310 can determine whether power feed connector 600 is connected or disconnected and fitted or not fitted from a combined resistance determined from resistors R10, R15, R30, and R31 combined together.

Power feed connector 600 including switch SW30 further includes a switch SW10. Switch SW10 is provided on connection circuit 604 between connection 601 and connection 602. Switch SW10 is normally opened.

Switch SW10 and switch SW30 are ganged by control portion 615 being operated. When control portion 615 is operated by a user, switch SW10 is closed and switch SW30 is opened. Unless control portion 615 is operated, switch SW10 is opened and switch SW30 is closed.

When switch SW10 is closed, connection circuit 604 connects connection 601 and connection 602. Accordingly, when power feed connector 600 is attached to AC inlet 220 and switch SW10 is operated, connection circuit 604 connects connection signal line L3 and control pilot line L1.

Note that switch SW30 may be normally opened and switch SW10 may be normally closed. In that case, when control portion 615 is operated by the user, switch SW10 is opened and switch SW30 is closed. In other words, switch SW10 and switch SW30 may be adapted to be closed and opened, respectively, unless control portion 615 is operated. Switch SW10 and switch SW30 are provided to change connection signal line L3 and control pilot line L1 in potential.

CPU 310 recognizes that power feed connector 600 has been attached from in what pattern connection signal line L3 and control pilot line L1 vary in potential. More specifically, when connection signal line L3 and control pilot line L1 synchronously increase in potential and thereafter synchronously decrease in potential, CPU 310 recognizes that power feed connector 600 has been attached.

How switch SW30 and switch SW10 have their respective normal states combined and how many times control portion 615 is operated can be modified variously. ECU 300 is only required to be modified in software to allow a modified combination to be recognized as a corresponding state.

Once CPU 310 has recognized that power feed connector 600 has been connected, CPU 310 opens CHR 210 and closes DCHR 211, and CPU 310 also controls AC 100 V inverter 201 to perform a power feeding operation to supply electric power from power storage device 110 to external electrical equipment 700.

Furthermore, when power storage device 110 has a reduced SOC or an instruction is received from the user, CPU 310 drives engine 160 to operate motor generator 130 to generate electric power and supplies the generated electrical power to electrical equipment 700.

Direct Current Charging Mode and Direct Current Discharging Mode

Figure 5:
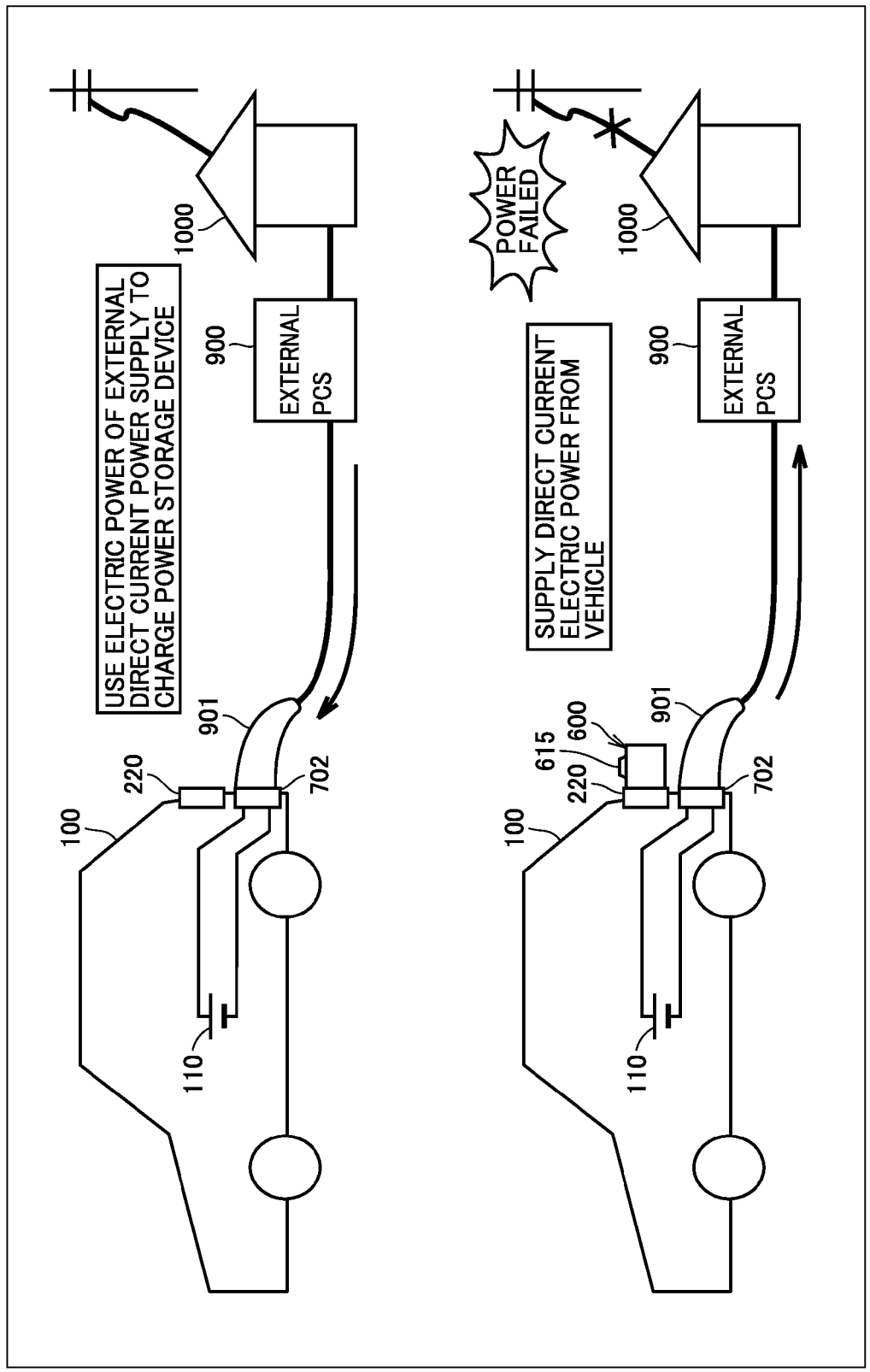
FIG. 5 is a diagram for generally illustrating a direct current charging mode and a direct current discharging mode.

FIG. 5 is a diagram for generally illustrating a direct current charging mode and a direct current discharging mode. With reference to FIG. 5, the direct current charging mode is a mode allowing an external dc power supply's electric power to be used to charge a power storage device of a vehicle. It is often the case that the direct current charging mode allows faster charging than the alternating current charging mode.

Normally, in the direct current charging mode, ac power received by household premises 1000 from a commercial power supply is converted into dc power in an external power conditioner station (hereinafter referred to as an external PCS) 900 and supplied to power storage device 110 via a DC charging plug 901 and DC inlet 702. On this occasion, AC inlet 220 normally does not have any component connected thereto.

When an emergency arises and commercial power supply has failed, it would be convenient if vehicle 100 is able to supply household premises 1000 with electric power. In that case, however, the commercial power supply has failed, and external PCS 900 may not be able to generate a controlling power supply voltage. In that case, even if the vehicle 100 power storage device 110 has electric power stored therein, it is impossible to communicate with external PCS 900 or transmit or receive electric power.

Accordingly, the present embodiment provides vehicle 100 configured to be modifiable so that a controlling power supply potential that normally should be provided from external PCS 900 can be generated in the vehicle in an emergency. The configuration is modified in response to an instruction, which is input to an input device, and control portion 615 of power feed connector 600 is used as the input device. It is expected that the vehicle is equipped with power feed connector 600 for emergencies, and it is very likely that power feed connector 600 can be used in such a case described above.

Figure 6:
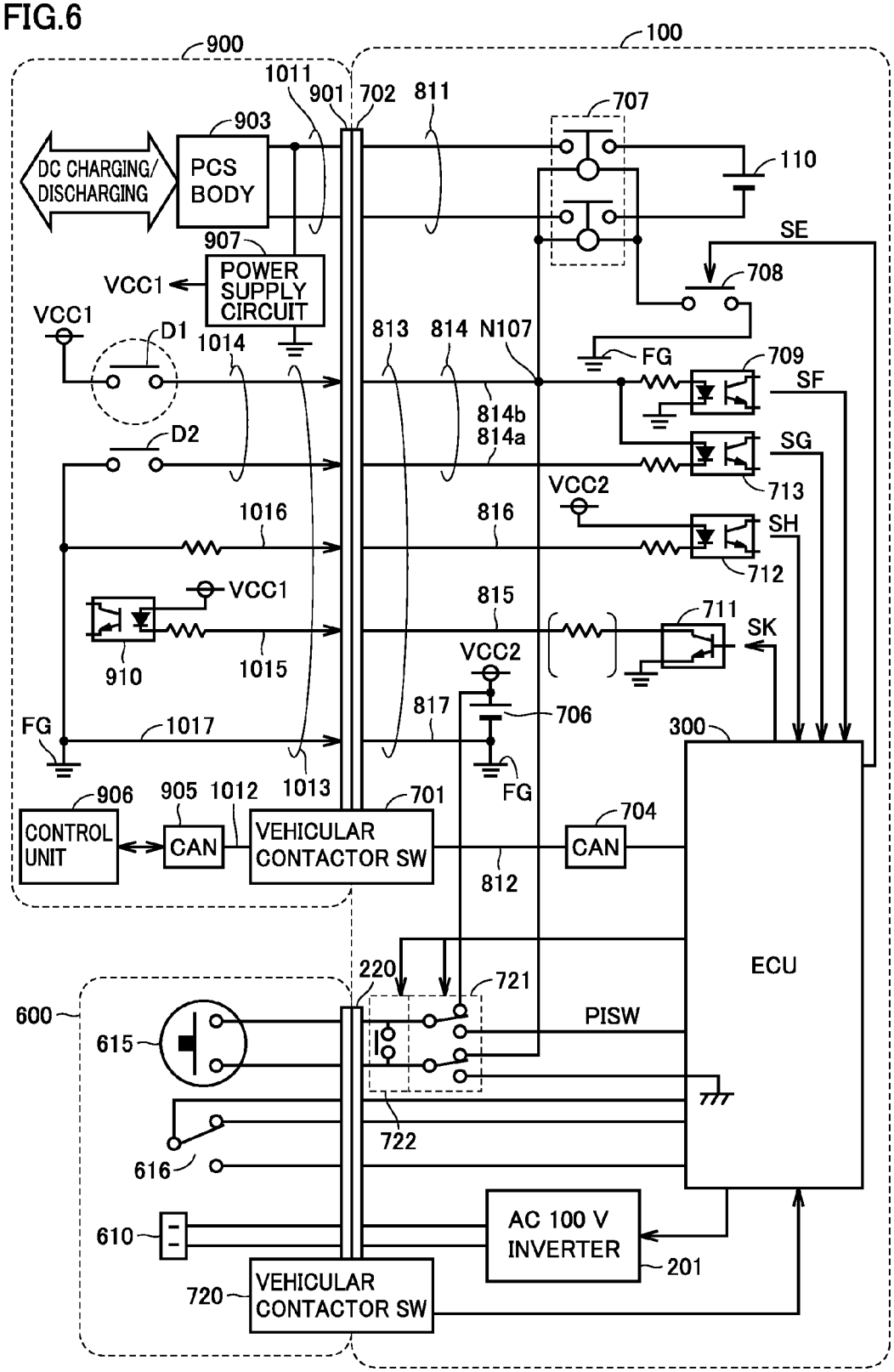
FIG. 6 shows a configuration of a vehicle, a power conditioner and a power feed connector associated with the direct current charging mode and the direct current discharging mode.

FIG. 6 shows a configuration of a vehicle, power conditioner and power feed connector associated with the direct current charging and discharging modes.

Direct Current Charging Mode at Normal Time

With reference to FIG. 6, in the direct current charging and discharging modes, vehicle 100 is connected to PCS 900 charging a vehicular mounted battery (or power storage device 110).

PCS 900 includes a DC charging plug 901, a PCS body 903, a CAN communication unit 905, a control unit 906, a power supply circuit 907, relays D1 and D2, and a photocoupler 910.

A power line pair 1011, a communication signal line 1012, and a control signal line group 1013 are accommodated in a single charging cable. Herein, power line pair 1011 is an electric power line for transmitting and receiving electric power between vehicle 100 and PCS 900, and communication signal line 1012 is a communication line for communicating with vehicle 100. Control signal line group 1013 has a controlling power line pair 1014, an operation permitting/prohibiting signal line 1015, a connector connection confirming signal line 1016, and a ground line 1017 connected to a ground potential.

DC charging plug 901 is attached at a tip of a charging cable and has a terminal of each line (i.e., power line pair 1011, communication signal line 1012, and control signal line group 1013) accommodated in the charging cable. Once DC charging plug 901 has been attached to vehicle 100 at DC inlet 702, power line pair 1011, communication signal line 1012, and control signal line group 1013 are electrically connected to the vehicle 100 power line pair 811, communication line 812, and controlling communication line group 813, respectively.

PCS body 903 in charging receives ac power from a commercial power supply and converts the received ac power into dc power. When PCS body 903 receives electric power from the vehicle, PCS body 903 receives dc power supplied from the vehicle via DC inlet 702 and converts the received dc power into ac power used in household premises.

CAN communication unit 905 communicates with vehicle 100 via communication signal line 1012 in accordance with a communications protocol of the Controller Area Network (CAN).

Control unit 906 operates in response to signals received from photocoupler 910, CAN communication unit 905 and the like to control relays D1, D2 and PCS body 903.

Power supply circuit 907 is a power supply for supplying driving electric power to CAN communication unit 905, control unit 906, relays D1, D2, photocoupler 910 and other each component of a communication and control system. Normally (or when there is no power failure), power supply circuit 907 receives dc power output from PCS body 903 and generates a controlling power supply potential VCC1.

Relay D1 is disposed between a VCC1 output terminal of power supply circuit 907 and a positive polarity line of controlling power line pair 1014, and operates in response to a control signal of control unit 906 to connect/disconnect the positive polarity line of controlling power line pair 1014 to/from potential VCC1.

Relay D2 is disposed between the ground potential and a negative polarity line of controlling power line pair 1014, and operates in response to a control signal of control unit 906 to connect/disconnect the negative polarity line of controlling power line pair 1014 to/from the ground potential.

Photocoupler 910 transmits a signal to control unit 906 to switch permitting an operation to prohibiting it and vice versa depending on whether operation permitting/prohibiting signal line 1015 is allowed or disallowed to conduct.

Vehicle 100 includes DC inlet 702, power storage device 110, a CAN communication unit 704, ECU 300, relays 707 and 708, photocouplers 709, 712, 713, and a signal driver 711.

DC inlet 702 includes a terminal of power line pair 811, communication line 812, and controlling communication line group 813. Power line pair 811 is an electric power line for receiving charging electric power from PCS 900, and communication line 812 is a communication line for communicating with PCS 900. Controlling communication line group 813 includes a controlling power supplying line pair 814, an operation permitting/prohibiting signal line 815, a connector connection confirming signal line 816, and a ground line 817 connected to a ground potential.

Once PCS 900 has DC charging plug 901 attached to DC inlet 702, the vehicle's power line pair 811, communication line 812, and controlling communication line group 813 are electrically connected to the PCS 900 power line pair 1011, communication signal line 1012, and control signal line group 1013, respectively.

Power storage device 110 is a battery for supplying driving electric power to a drive system, such as a motor, an inverter and the like for driving vehicle 100.

CAN communication unit 704 communicates with PCS 900 via communication line 812 in accordance with a communications protocol of the CAN. ECU 300 oversees and thus controls each component of vehicle 100. Note that the FIG. 6 ECU 300 may be an ECU that is provided separately from a travelling control unit and initiated in externally charging the vehicle and discharging outside the vehicle.

Each component of the communication and control system, such as CAN communication unit 704, ECU 300, relay 708 and photocouplers 709, 712, 713, and signal driver 711, excluding relay 707, is supplied with power supply potential VCC2 from an auxiliary battery 706 as driving electric power.

Relay 707 is disposed between power line pair 811 and the positive and negative electrodes of power storage device 110, and connects/disconnects power storage device 110 to/from power line pair 811. Relay 707 is a contact opened when controlling electric power is not conducted. When driving electric power is supplied from PCS 900 via a controlling power supplying line 814b with relay 708 closed, it is used as driving electric power to close relay 707 and thus connect power line pair 811 to power storage device 110.

Relay 708 is disposed between a ground potential FG and relay 707, and operates in response to a control signal SE received from ECU 300 to conduct and interrupt a current of a drive coil of relay 707. Note that relay D2 may be eliminated and line 814 may be connected to ground potential FG, and relay 708 may be disposed between a line 814a and relay 707.

Photocoupler 709 transmits to ECU 300 an operation starting/stopping signal SF depending on whether PCS 900 has relay D1 opened or closed while a connecter is connected. Specifically, an input side has a light emitting device disposed between a positive polarity line of controlling power supplying line pair 814 and a ground potential in series with a resistor, and when PCS 900 has relay D1 closed with a connecter connected, and accordingly, a current path is formed between controlling power supplying line 814b and ground potential FG and the light emitting device of the input side receives an on-state current, a light receiving device of an output side outputs operation starting/stopping signal SF to ECU 300.

Photocoupler 713 transmits to ECU 300 an operation starting/stopping signal SG depending on whether PCS 900 has two relays D1 and D2 opened or closed while a connecter is connected. Specifically, an input side has a light emitting device disposed between the positive polarity line of controlling power supplying line pair 814 and a negative polarity line thereof, and when PCS 900 has relays D1 and D2 closed with a connecter connected, and accordingly, controlling power supplying line pair 814 conducts and the light emitting device of the input side thus receives an on-state current, a light receiving device of an output side outputs operation starting/stopping signal SG to ECU 300.

When signal driver 711 receives an on-state current from ECU 300, signal driver 711 couples operation permitting/prohibiting signal line 1015 of PCS 900 with ground potential FG while a connecter is connected. Specifically, signal driver 711 is disposed between operation permitting/prohibiting signal line 815 and a ground potential, and when ECU 300 issues a control signal SK to allow an on-state current to flow through signal driver 711 at a base electrode, operation permitting/prohibiting signal line 815 is coupled with ground potential FG.

Photocoupler 712 transmits to ECU 300 a connector connection acknowledgement signal SH depending on whether DC charging plug 901 and DC inlet 702 are connected together. Specifically, an input side has a light emitting device disposed between a positive electrode (potential VCC2) of auxiliary battery 706 and connector connection confirming signal line 816, and when DC charging plug 901 is connected to DC inlet 702 and accordingly, connector connection confirming signal line 816 is connected to connector connection confirming signal line 1016 and the light emitting device of the input side receives an on-state current, connector connection acknowledgement signal SH is output to ECU 300.

Direct Current Charging and Discharging Modes in Emergency

An operation performed in an emergency (or when a commercial power supply has failed) will now be described. When power feed connector 600 is connected to AC inlet 220 in an emergency, a signal indicating that power feed connector 600 has been attached to the vehicle is input to ECU 300 from a vehicular contactor switch 720. In response, ECU 300 operates in response to detection signal PISW that has a state varying as control portion 615 is operated to charge/discharge dc power via DC inlet 702.

A switch 721 is set in an initial state to allow ECU 300 to detect via detection signal PISW in what state control portion 615 has a switch thereof. Furthermore, in the initial state, control portion 615 is separated from a node N107 and power supply potential VCC2. When DC charging plug 901 is connected to DC inlet 702, ECU 300 operates, in response to how control portion 615 is operated, to operate switch 721 as shown in FIG. 6 to cause relay 722 to conduct to connect node N107 to power supply potential VCC2.

Specifically, when DC charging plug 901 and power feed connector 600 are both attached to the vehicle and in that condition control portion 615 has the switch operated in a first pattern (e.g., pressed twice), then the power feed connector discharges ac power as shown in FIG. 2 at the lower portion. In doing so, ECU 300 maintains switch 721 in the initial state.

Furthermore, when DC charging plug 901 and power feed connector 600 are both attached to the vehicle and in that condition control portion 615 has the switch operated in a second pattern (e.g., pressed continuously for a prescribed period of time), then the power feed connector discharges dc power as shown in FIG. 5 at the lower portion.

In doing so, ECU 300 switches switch 721 from the initial state to a state shown in FIG. 6 and also causes relay 722 to conduct. This allows node N107 to receive a controlling power supply potential of power supply potential VCC2 from the vehicle. This allows relay 707 to be closed, and thereafter, power supply circuit 907 generates potential VCC1, and CAN communication units 704 and 905 can be used to allow vehicle 100 and PCS 900 to communicate therebetween.

Figure 7:
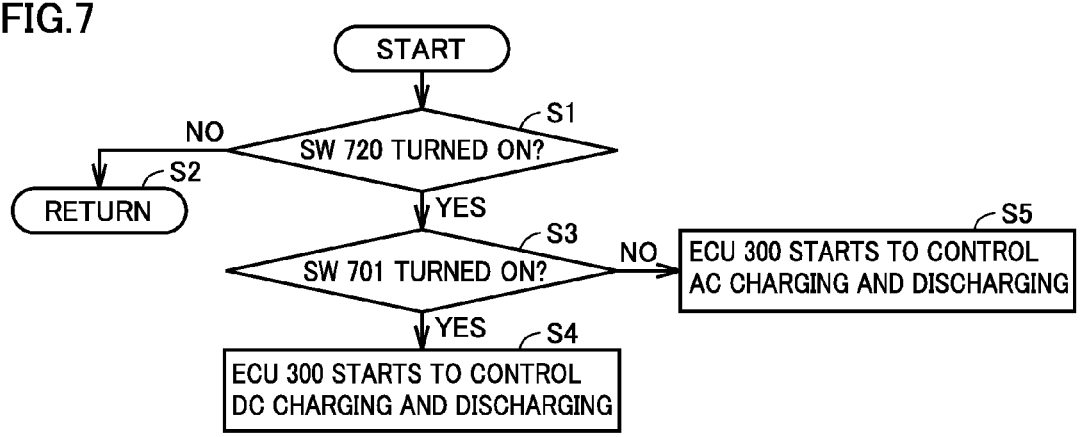
FIG. 7 is a flowchart of a first example for illustrating how an ECU applies control for DC charging and discharging in an emergency.

FIG. 7 is a flowchart of a first example for illustrating how the ECU applies control for DC charging and discharging in an emergency. This flowchart represents a process invoked from a prescribed main routine whenever a prescribed period of time elapses or whenever a prescribed condition is established.

With reference to FIG. 6 and FIG. 7, the process starts, and in step S1, ECU 300 operates in response to a signal received from vehicular contactor switch 720 to detect whether power feed connector 600 is connected to AC inlet 220. If vehicular contactor switch 720 outputs a signal having an off state (i.e., if the power feed connector is not connected), the control proceeds to step S2, and the control returns to the main routine. In contrast, if in step S1 vehicular contactor switch 720 outputs a signal having an on state (i.e., if the power feed connector is connected), the control proceeds to step S3.

In step S3, ECU 300 operates in response to a signal received from a vehicular contactor switch 701 to detect whether DC charging plug 901 is connected to DC inlet 702. If vehicular contactor switch 701 outputs a signal having an off state (i.e., if the DC plug is not connected), the control proceeds to step S5, and ECU 300 starts to control AC charging and discharging, as shown in FIG. 2.

If in step S3 vehicular contactor switch 701 outputs a signal having an on state (i.e., if the DC plug is connected), the control proceeds to step S4, and ECU 300 starts to control DC charging and discharging, as shown in FIG. 5.

The above first example for control implements the following:

A vehicle having a DC charging inlet and an AC charging inlet both mounted therein allows DC charging to be started by a trigger controlled by a control portion operated to control detection signal PISW of an AC discharging connector (i.e., power feed connector 600).

Furthermore, when a vehicle having a DC charging inlet and an AC charging inlet both mounted therein accommodates both AC discharging and DC discharging, and the vehicle does not have a DC connecter inserted thereto and has an AC connecter inserted thereto and detection signal PISW has an on state, AC discharging is controlled. In contrast, when the vehicle has the DC and AC connecters inserted thereto and detection signal PISW has the on state, DC discharging is controlled.

FIG. 8 is a flowchart of a second example for illustrating how the ECU applies control for DC charging and discharging in an emergency. This flowchart represents a process invoked from a prescribed main routine whenever a prescribed period of time elapses or whenever a prescribed condition is established.

With reference to FIG. 6 and FIG. 8, the process starts, and in step S11, ECU 300 operates in response to a signal received from vehicular contactor switch 720 to detect whether power feed connector 600 is connected to AC inlet 220. If vehicular contactor switch 720 outputs a signal having an off state (i.e., if the power feed connector is not connected), the control proceeds to step S12, and the control returns to the main routine. In contrast, if in step S11 vehicular contactor switch 720 outputs a signal having an on state (i.e., if the power feed connector is connected), the control proceeds to step S13.

In step S13, ECU 300 operates in response to a signal received from vehicular contactor switch 701 to detect whether DC charging plug 901 is connected to DC inlet 702. If vehicular contactor switch 701 outputs a signal having an off state (i.e., if the DC plug is not connected), the control proceeds to step S20, and ECU 300 prepares for starting controlling AC charging and discharging, as shown in FIG. 2.

If in step S13 vehicular contactor switch 701 outputs a signal having an on state (i.e., if the DC plug is connected), the control proceeds to step S14, and ECU 300 prepares for starting controlling DC charging and discharging, as shown in FIG. 5.

When step S14 is performed to prepare for starting controlling DC charging and discharging, the control then proceeds to step S15 and ECU 300 determines whether control portion 615 has been operated in a pattern of pressing the switch once.

If in Step S15 ECU 300 determines that the switch has been pressed once, then the control proceeds to Step S16, and if the switch has not been pressed once, then the control proceeds to Step S27.

In step S16, node N107 is supplied with a DC control power supply of power supply potential VCC2 from the vehicle. Specifically, as control portion 615 has the switch pressed, relay 722 conducts, and switch 721 is also operated to thus supply power supply potential VCC2 in place of power supply potential VCC1 to node N107. In other words, control portion 615 can be operated, rather than relay D1 is controlled to conduct, to supply a controlling power supply potential to a portion of the vehicle that is associated with DC charging and discharging.

Then, in step S17, ECU 300 further proceeds with a preparation for starting DC charging. Specifically, ECU 300 performs CAN communication in step S18, and after charging conditions such as time, voltage, current and the like have been confirmed, the control proceeds to step S19 to start charging power storage device 110 by dc power via the DC inlet.

Furthermore, when the control proceeds to step S27, the control determines whether control portion 615 has had the switch pressed continuously for a long period of time. If so, the control proceeds to step S28, otherwise, the control proceeds to step S32.

In step S28, node N107 is supplied with a DC control power supply of power supply potential VCC2 from the vehicle. Specifically, as control portion 615 has the switch pressed, relay 722 conducts, and switch 721 is also operated to thus supply power supply potential VCC2 in place of power supply potential VCC1 to node N107. In other words, control portion 615 can be operated, rather than relay D1 is controlled to conduct, to supply a controlling power supply potential to a portion of the vehicle that is associated with DC charging and discharging.

Then, in step S29, ECU 300 further proceeds with a preparation for starting DC discharging. Specifically, ECU 300 performs CAN communication in step S30, and after discharging conditions such as time, voltage, current and the like have been confirmed, the control proceeds to step S31 to start discharging power storage device 110 outside the vehicle via the DC inlet by dc power.

Note that if in step S27 the control determines that the switch has not been pressed continuously for a long period of time, the control proceeds to step S32. As shown in steps S32 and S33, for example if the switch is pressed twice for a short period of time, ECU 300 ignores the operation of control portion 615 to avoid causing anything to happen in particular.

If the control proceeds from step S13 to step S20 to prepare for starting controlling AC charging and discharging, the control then proceeds to step S21 and ECU 300 determines whether control portion 615 has been operated in a pattern of pressing the switch once.

If in Step S21 ECU 300 determines that the switch has been pressed once, then the control proceeds to Step S22, and even if the DC inlet has the DC plug connected thereto, ECU 300 starts AC charging, as shown in FIG. 2 at the upper portion. In that case, charging connector 410, rather than power feed connector 600, must be connected. Charging connector 410 is also provided with a switch corresponding to control portion 615, and detection signal PISW can thus be changed to a prescribed pattern.

If in Step S21 ECU 300 determines that the switch has not been pressed once, then the control proceeds to Step S23, and ECU 300 further determines whether control portion 615 has been operated in a pattern of pressing the switch twice. If so, then the control proceeds to Step S24, and even if the DC inlet has the DC plug connected thereto, ECU 300 starts AC discharging, as shown in FIG. 2 at the lower portion.

If in step S23 the control determines that control portion 615 has not been operated in the pattern of pressing the switch twice, the control proceeds to step S25. As shown in steps S25 and S26, for example if the switch has been pressed continuously for a prescribed period of time, ECU 300 ignores the operation of control portion 615 to avoid causing anything to happen in particular.

Note that while Steps S15, S21, S23, S27 are performed by referring to how control portion 615 is operated to switch charging to discharging and vice versa, a setting of a charging/discharging switching switch (or control portion 616) that is shown in FIGS. 3 and 6 may be read by ECU 300 to accordingly switch charging to discharging and vice versa.

Furthermore, while the FIG. 6 configuration shows that ECU 300 switches switch 721 and relay 722 is controlled to conduct to supply a controlling power supply of power supply potential VCC2 to node N107, switch 721 and relay 722 may be dispensed with and a switch may be provided so that how control portion 615 is operated may be referred to and ECU 300 may accordingly connect power supply potential VCC2 to node N107 only for a prescribed period of time.

Thus in the present embodiment a controlling power supply potential is supplied from a vehicle, rather than relay D1 of FIG. 6, depending on how a switch that controls detection signal PISW is operated.

The above second example for control implements the following:

When a vehicle having a DC charging inlet and an AC charging inlet both mounted therein accommodates both AC discharging and DC discharging, and the vehicle has a DC connecter inserted thereto, detection signal PISW's pattern can be referred to to switch AC discharging to DC discharging and vice versa (for example provide AC discharging in response to a switch being pressed twice, and provide DC discharging in response to the switch being pressed for a long period of time).

Furthermore, when a vehicle having a DC charging inlet and an AC charging inlet both mounted therein accommodates both AC discharging and DC discharging, an operation performed to change detection signal PISW that is issued from an AC connector allows a controlling power supply to be supplied to initiate an external PCS.

Furthermore, when a vehicle having a DC charging inlet and an AC charging inlet both mounted therein accommodates both AC discharging and DC discharging, an operation performed to change detection signal PISW that is issued from an AC connector allows the external PCS to start CAN communication.

Finally, the present embodiment is summarized with reference again to the drawings. Vehicle 100 capable of supplying electric power to outside the vehicle comprises: power storage device 110; a first connecter (AC inlet 220) capable of charging and discharging electric power of power storage device 110; a second connecter (DC inlet 702) capable of charging and discharging electric power of power storage device 110; and ECU 300 that controls charging and discharging provided via the first connecter, and charging and discharging provided via the second connecter. ECU 300 is operative in response to a control portion (control portion 415 or 615, 616) being operated to select and perform any one of discharging power storage device 110 via the first connecter, charging power storage device 110 via the first connecter, discharging power storage device 110 via the second connecter, and charging power storage device 110 via the second connecter, the control portion being provided at a first plug (charging connector 410 or power feed connector 600) connected to the first connecter.

This allows an operation in an emergency such as power failure to be selected by an input that is input through the first plug, and the vehicle can dispense with an additional input unit.

Preferably, control portions 615, 616 are configured to be capable of issuing a switch-charging/discharging instruction, and a perform-charging-or-discharging instruction. ECU 300 is signaled of a state of the control portion via the first connector (AC inlet 220), and when ECU 300 receives a discharge instruction and also receives the perform instruction, ECU 300 performs discharging power storage device 110 to outside the vehicle, and when ECU 300 receives a charge instruction and also receives the perform instruction, ECU 300 allows electric power to be received from outside the vehicle to perform charging power storage device 110. Note that the charge instruction or the discharge instruction and the perform instruction may simply be provided by inputting a pattern via control portion 615, as shown in FIG. 8.

More preferably, as shown in FIG. 7 and FIG. 8, when ECU 300 receives the perform instruction and the discharge instruction via the first connector (AC inlet 220), with a second plug (DC charging plug 901) unconnected to the second connector (DC inlet 702), ECU 300 performs discharging power storage device 110 to outside the vehicle via the first connector (AC inlet 220). When ECU 300 receives the perform instruction and the discharge instruction via the first connector (AC inlet 220), with the second plug (DC charging plug 901) connected to the second connector (DC inlet 702), ECU 300 performs discharging power storage device 110 to outside the vehicle via the second connector (DC inlet 702).

Preferably, as shown in FIG. 6, the second connector (DC inlet 702) is configured to allow the second plug (DC charging plug 901) to be connected thereto, the second plug being provided at one end of a cable having the other end connected to PCS 900. Control portion 615 is configured to be capable of issuing a first pattern signal (e.g., representing pressing once) and a signal of a pattern different from the first pattern signal (e.g., representing pressing for a long period of time, twice or the like). As shown in FIG. 8, when ECU 300 receives the first pattern signal via the first connector (AC inlet 220), with the second plug (DC charging plug 901) connected to the second connector (DC inlet 702) (YES in step S15 or S21), ECU 300 allows electric power to be received from outside the vehicle via the first connector (AC inlet 220) or the second connector (DC inlet 702) to perform charging the power storage device (Step S19 or S22), and when ECU 300 receives via the first connector (AC inlet 220) the signal different from the first pattern signal (representing pressing for a long period of time or twice), with the second plug (DC charging plug 901) connected to the second connector (DC inlet 702) (YES in step S23 or S27), ECU 300 performs discharging the power storage device to outside the vehicle via the first connector or the second connector (Step S24 or S31).

Still preferably, as shown in FIG. 6, the second connector (DC inlet 702) includes input node N107 to receive from PCS 900 a signal (controlling power supply potential VCC1) indicative of a command to start discharging from the power storage device 110 to PCS 900. When ECU 300 receives the charge instruction or the discharge instruction via the first connector (AC inlet 220), with the first plug (power feed connector 600) connected to the first connector (AC inlet 220), and the second plug (DC charging plug 901) connected to the second connector (DC inlet 702), then, rather than PCS 900, ECU 300 instead outputs to input node N107 a signal (controlling power supply potential VCC2) indicative of the command to start discharging.

More preferably, as shown in FIG. 6, the second connector (DC inlet 702) is configured to allow the second plug (DC charging plug 901) to be connected thereto, the second plug being provided at one end of a cable having the other end connected to PCS 900. The vehicle further comprises first CAN communication unit 704. PCS 900 includes second CAN communication unit 905. As has been shown in FIG. 8, when ECU 300 receives an instruction from control portion 615, with the second plug (DC charging plug 901) connected to the second connector (DC inlet 702) (YES in step S15 or S27), then ECU 300 initiates first CAN communication unit 704 to perform CAN communication.

Preferably, as shown in FIG. 6, the first connector (AC inlet 220) is a connector for alternating current power and the second connector (DC inlet 702) is a connector for direct current power.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

100: vehicle; 110: power storage device; 130, 135: motor generator; 121: converter; 122, 123: inverter; 125: air conditioner; 140: driving force transmission gear; 150: driving wheel; 160: engine; 180: motor drive device; 200: charger; 201: AC 100 V inverter; 220: AC inlet; 320: resistor circuit; 340: input buffer; 350: power supply node; 370: nonvolatile memory; 400: charging cable; 410: charging connector; 415, 615, 616: control portion; 420: plug; 440, ACL1, ACL2: power line; 500: external ac power supply; 510: receptacle; 600: power feed connector; 601, 602, 603: connection; 604: connection circuit; 605: fitting portion; 606: power transmission portion; 610: output portion; 700: electrical equipment; 701, 720: vehicular contactor switch; 702: DC inlet; 704, 905: communication unit; 706: auxiliary battery; 707: charging and discharging relay; 709, 712, 713, 910: photocoupler; 710: power supply plug; 711: signal driver; 721: switch; 811, 1011: power line pair; 812: communication line; 813: controlling communication line group; 814: controlling power supplying line pair; 815, 1015: operation permitting/prohibiting signal line; 816, 1016: connector connection confirming signal line; 817, 1017, L2: ground line; 900: PCS; 901: charging plug; 903: PCS body; 906: control unit; 907: power supply circuit; 1000: household premises; 1012: communication signal line; 1013: control signal line group; 1014: controlling power line pair; 210: charging relay; 211: discharging relay; L1: control pilot line; L3: connection signal line; N107: node; NL1: negative power line; PL1, PL2: positive power line; SW10, SW30: switch.

The invention claimed is:

1. A vehicle capable of supplying electric power to outside the vehicle, comprising:
   a power storage device;
   a first connecter capable of charging and discharging electric power of said power storage device;
   a second connecter capable of charging and discharging electric power of said power storage device; and
   a control device that controls charging and discharging provided via said first connector, and charging and discharging provided via said second connector,
   said control device being operative in response to a control portion being operated to select and perform any one of discharging said power storage device via said first connector, charging said power storage device via said first connector, discharging said power storage device via said second connector, and charging said power storage device via said second connector, said control portion being provided at a first plug connected to said first connector.

2. The vehicle according to claim 1, wherein:
said control portion is configured to be capable of issuing a charge instruction or a discharge instruction and a perform instruction of charging or discharging; and
said control device is signaled of a state of said control portion via said first connector, and when said control device receives said discharge instruction and also receives said perform instruction, said control device performs discharging said power storage device to outside the vehicle, and when said control device receives said charge instruction and also receives said perform instruction, said control device allows electric power to be received from outside the vehicle to perform charging said power storage device.

3. The vehicle according to claim 2, wherein:
when said control device receives said perform instruction and said discharge instruction via said first connector, with a second plug unconnected to said second connector, said control device performs discharging said power storage device to outside the vehicle via said first connector; and
when said control device receives said perform instruction and said discharge instruction via said first connector, with said second plug connected to said second connector, said control device performs discharging said power storage device to outside the vehicle via said second connector.

4. The vehicle according to claim 2, wherein:
said second connector is configured to allow a second plug to be connected thereto, said second plug being provided at one end of a cable having the other end connected to a power conditioner station;
the vehicle further comprises a first CAN communication unit;
said power conditioner station includes a second CAN communication unit; and
when said control device receives an instruction from said control portion, with said second plug connected to said second connector, said control device initiates said first CAN communication unit to perform communication.

5. The vehicle according to claim 1, wherein:
said second connector is configured to allow a second plug to be connected thereto, said second plug being provided at one end of a cable having the other end connected to a power conditioner station;
said control portion is configured to be capable of issuing a first pattern signal and a signal of a pattern different from said first pattern signal;
when said control device receives said first pattern signal via said first connector, with said second plug connected to said second connector, said control device allows electric power to be received from outside the vehicle via said first connector or said second connector to perform charging said power storage device; and
when said control device receives said signal different from said first pattern signal via said first connector, with said second plug connected to said second connector, said control device performs discharging said power storage device to outside the vehicle via said first connector or said second connector.

6. The vehicle according to claim 5, wherein:
said control portion is configured to be capable of issuing a charge instruction or a discharge instruction and a perform-charging-or-discharging instruction;
said second connector includes an input node to receive from said power conditioner station a signal indicative of a command to start discharging from said power storage device to said power conditioner station; and
when said control device receives said charge instruction or said discharge instruction via said first connector, with said first plug connected to said first connector, and said second plug connected to said second connector, instead of said power conditioner station, said control device outputs to said input node a signal indicative of said command to start discharging.

7. The vehicle according to claim 1, wherein:
said first connector is a connector for alternating current power; and
said second connector is a connector for direct current power.

* * * * *